(12) United States Patent
Masaki

(10) Patent No.: US 9,709,916 B2
(45) Date of Patent: Jul. 18, 2017

(54) OPTICAL SCANNING DEVICE AND IMAGE FORMING APPARATUS

(71) Applicant: KYOCERA Document Solutions Inc., Osaka (JP)

(72) Inventor: Akihiro Masaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/035,248

(22) PCT Filed: Dec. 22, 2014

(86) PCT No.: PCT/JP2014/083833
§ 371 (c)(1),
(2) Date: May 9, 2016

(87) PCT Pub. No.: WO2015/129135
PCT Pub. Date: Sep. 3, 2015

(65) Prior Publication Data
US 2016/0274485 A1    Sep. 22, 2016

(30) Foreign Application Priority Data
Feb. 26, 2014  (JP) ................................ 2014-035092

(51) Int. Cl.
*G03G 15/04* (2006.01)
*B41J 2/44* (2006.01)
(Continued)

(52) U.S. Cl.
CPC .......... *G03G 15/04036* (2013.01); *B41J 2/44* (2013.01); *B41J 2/47* (2013.01);
(Continued)

(58) Field of Classification Search
CPC ......... G03G 21/1666; G03G 15/04036; G03G 15/04072
(Continued)

(56) References Cited

U.S. PATENT DOCUMENTS 4,928,129 A * 5/1990 Honda ..................... B41J 13/00
346/145
5,343,223 A * 8/1994 Tohyama ............... G03G 15/65
347/134
(Continued)

FOREIGN PATENT DOCUMENTS

JP    2003-337294 A    11/2003
JP    2006-017881 A    1/2006
(Continued)

OTHER PUBLICATIONS

International Search Report of PCT/JP2014/083833 mailed Feb. 3, 2015.
Written Opinion of PCT/JP2014/083833 mailed Feb. 3, 2015.

*Primary Examiner* — Walter L Lindsay, Jr.
*Assistant Examiner* — Arlene Heredia Ocasio
(74) *Attorney, Agent, or Firm* — Studebaker & Brackett PC

(57) ABSTRACT

An optical scanning device (11) in the image forming apparatus (1) of the present invention includes a deflector (35, 37) deflecting a laser light scanning an image carrier (13) outputted from a light source (32Y, 32C, 32M, 32K); a first reflection mirror part (43Y, 43C, 43M, 43K) adjusting scanning curve of the laser light deflected by the deflector (35, 37); and a second reflection mirror part (44Y, 44C, 44M, 44K) arranged at a downstream side from the first reflection mirror part (43Y, 43C, 43M, 43K) in an optical path of the laser light to adjust scanning inclination of the laser light.

4 Claims, 12 Drawing Sheets

(51) Int. Cl.
 *G03G 15/00* (2006.01)
 *G02B 26/10* (2006.01)
 *G02B 26/12* (2006.01)
 *G03G 21/00* (2006.01)
 *H04N 1/113* (2006.01)
 *B41J 2/47* (2006.01)

(52) U.S. Cl.
 CPC ............. *G02B 26/10* (2013.01); *G02B 26/12* (2013.01); *G03G 15/00* (2013.01); *G03G 15/04* (2013.01); *G03G 15/04072* (2013.01); *G03G 21/00* (2013.01); *H04N 1/113* (2013.01); *G03G 2215/0132* (2013.01)

(58) Field of Classification Search
 USPC .................................... 399/4, 118, 126, 124
 See application file for complete search history.

(56) References Cited

U.S. PATENT DOCUMENTS

| | | | | |
|---|---|---|---|---|
| 6,145,967 | A | * | 11/2000 | Langford ............. B41J 2/17523 347/85 |
| 2004/0041992 | A1 | | 3/2004 | Yokoyama |
| 2010/0309278 | A1 | * | 12/2010 | Kodo ................... G02B 26/123 347/224 |

FOREIGN PATENT DOCUMENTS

| | | |
|---|---|---|
| JP | 2007-298859 A | 11/2007 |
| JP | 2008-003414 A | 1/2008 |
| JP | 2008-287092 A | 11/2008 |
| JP | 2010-097139 A | 4/2010 |
| JP | 2011-186382 A | 9/2011 |
| JP | 2013-083820 A | 5/2013 |

* cited by examiner

OPTICAL SCANNING DEVICE AND IMAGE FORMING APPARATUS

TECHNICAL FIELD

The present invention relates to an optical scanning device irradiating an image carrier with a laser light and an image forming apparatus including this optical scanning device.

BACKGROUND ART

Conventionally, an electrographic image forming apparatus, such as a copying machine or a printer, uses an optical scanning device composed of a laser scanning unit (LSU) or the like to form an electrostatic latent image on a surface of an image carrier, such as a photosensitive drum, and develops this electrostatic latent image by a toner, thereby performing an image forming operation.

The optical scanning device includes, for example, a light source outputting a laser light, a lens (e.g. a collimator lens or a cylindrical lens) concentrating the laser light outputted from this light source, a deflector, such as a polygon mirror, deflecting the laser light concentrated by this lens, and an optical element, such as a lens or a mirror, leading the laser light deflected by this deflector to the image carrier.

Moreover, when scanning the laser light from the optical scanning device onto the image carrier to form the electrostatic latent image, a problem, that this electrostatic latent image is curved or inclined in a sub-scanning direction of the laser light, may occur and color drift may be caused in color registration of a formed image. Thereupon, there is an optical scanning device adjusting component so as to prevent the problem of these scanning curving or scanning inclining.

For example, in Patent Document 1, an optical scanning device of an image forming apparatus includes a longitudinal lens correcting a plane tilt of a polygon mirror and is provided with an inclination adjustment driving part and a curve adjustment driving part with respect to this longitudinal lens to adjust inclination and curve of a scanning line conducting via the longitudinal lens. The curve adjustment driving part warps the longitudinal lens by a scanning line curve adjusting screw to adjust scanning line curve.

Moreover, in Patent Document 2, an optical scanning device of an image forming apparatus includes a reflection mirror leading a laser light to a photoreceptor and is provided with a curve correcting mechanism and an inclination correcting mechanism with respect to this reflection mirror to correct curve and inclination of a scanning line reflected by the reflection mirror. The curve correcting mechanism warps the reflection mirror by a curve adjusting screw to correct curve of the scanning line.

PRIOR ART DOCUMENT

Patent Document

[PATENT DOCUMENT 1] Japanese patent laid-open publication No. 2007-298859
[PATENT DOCUMENT 2] Japanese patent laid-open publication No. 2010-97139

SUMMARY OF INVENTION

Problems to be Solved by the Invention

However, in the above-mentioned techniques, because a plastic lens is forcedly warped and deformed, the plastic lens may creep-deform by deforming for a long time or being influenced by temperature variation. Therefore, although scanning curve adjusted by deforming the plastic lens is appropriately adjusted at first, after this optical member is used for a long time, it is feared that aged deterioration, such as displacement of adjustment state, occurs.

In addition, in the above-mentioned techniques, because scanning curve adjustment and scanning inclination adjustment are carried out with respect to one optical element, for example, new scanning curve may occurs if the scanning inclination adjustment is carried out after the scanning curve adjustment, or new scanning inclination may occurs if the scanning curve adjustment is carried out after the scanning inclination adjustment, and necessity to repeat the scanning curve adjustment and the scanning inclination adjustment is caused, thereby lengthening adjusting time.

Thereupon, the present invention takes the above-mentioned circumstances into account and its object is to provide an optical scanning device including a simple adjustment mechanism with respect to scanning curve and scanning inclination to be capable of shortening an adjustment time of the scanning curve and the scanning inclination.

Means for Solving the Problem

An optical scanning device of the present invention includes a deflector deflecting a laser light scanning an image carrier outputted from a light source; a first reflection mirror part adjusting scanning curve of the laser light deflected by the deflector; and a second reflection mirror part arranged at a downstream side from the first reflection mirror part in an optical path of the laser light to adjust scanning inclination of the laser light.

An image forming apparatus of the present invention includes an apparatus main body; a sheet feeding cartridge arranged attachably/detachably with respect to the apparatus main body and storing sheets; the above-mentioned optical scanning device arranged inside the apparatus main body; and an adjustment operation transmitting part having one end part exposed in a state where the sheet feeding cartridge is detached from the apparatus main body and another end part connected to the second reflection mirror part of the optical scanning device and transmitting adjustment operation of the second reflection mirror part from one end part to another end part.

Effects of the Invention

In accordance with the present invention, it is possible to provide an optical scanning device including a simple adjustment mechanism with respect to scanning curve and scanning inclination to be capable of shortening an adjustment time of the scanning curve and the scanning inclination.

MODES FOR CARRYING OUT THE INVENTION

In the following, with reference to the drawings, embodiments of the present invention will be described. In each following embodiment, a case of applying an image forming apparatus in accordance with the present invention to a printer 1 will be described. Hereinafter, the near sides on the papers in FIGS. 1 and 2 and the left side on the paper in FIG. 3 are regarded as the front side (the forward side) of the printer 1 and an arrow Fr in each figure indicates the front side of the printer 1.

Figure 1:
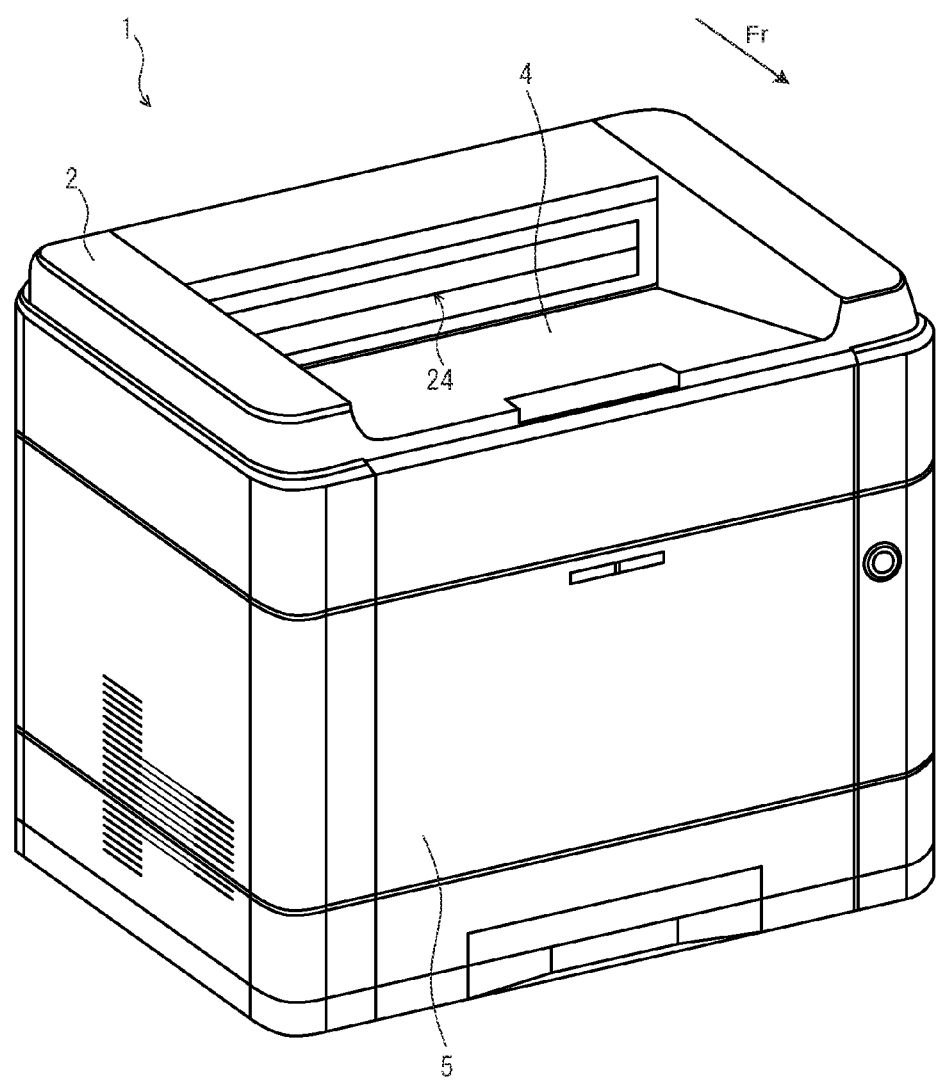
FIG. 1 It is a perspective view schematically showing a printer in accordance with an embodiment of the present invention.
Figure 2:
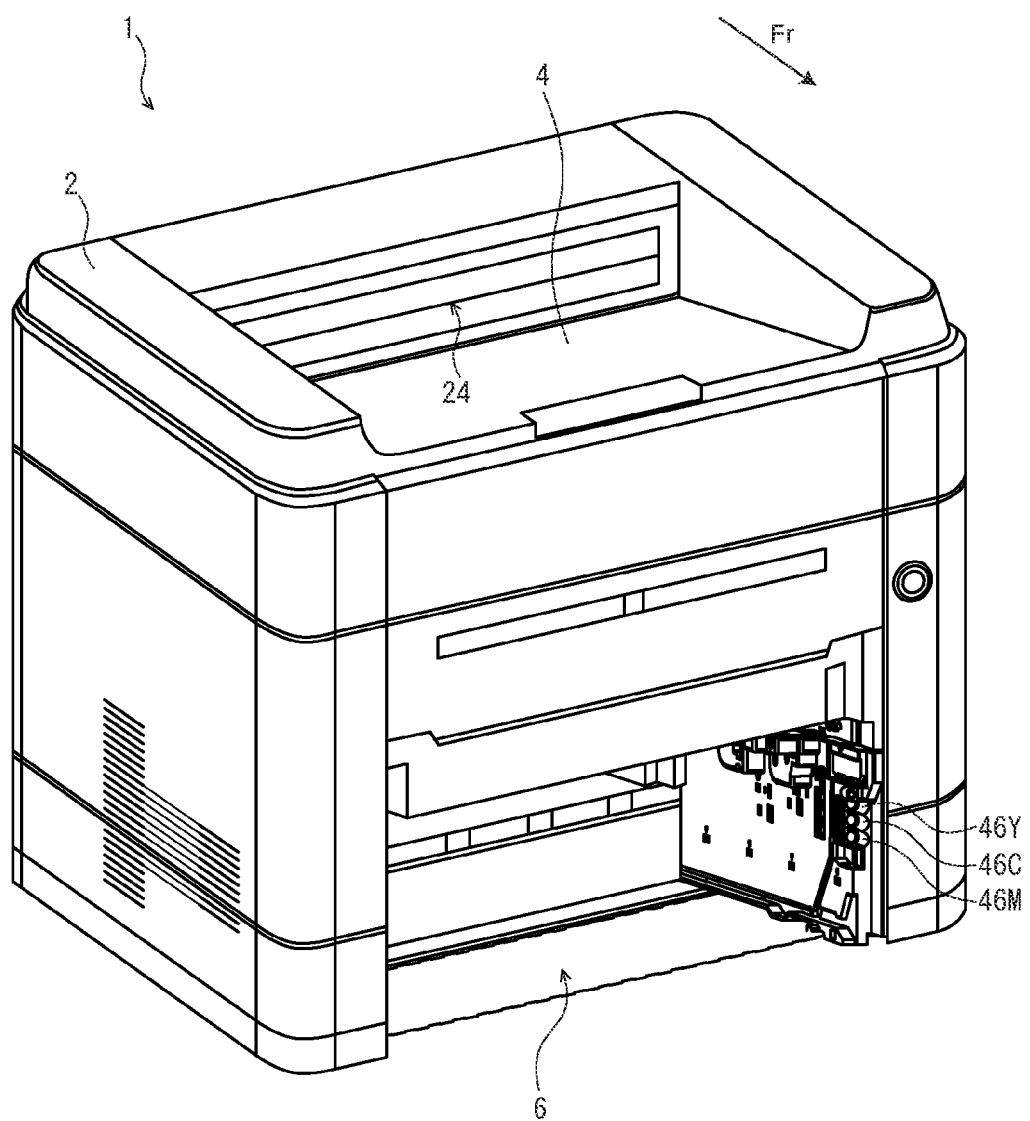
FIG. 2 It is a perspective view showing the printer in a state, where a cover part is detached, in accordance with the embodiment of the present invention.

As shown in FIGS. 1 and 2, the printer 1 includes a roughly box-formed printer main body (an apparatus main body) 2. In a lower part of the printer main body 2, a sheet feeding cartridge 3 (refer to FIG. 3) storing sheets (recording mediums) is arranged and, in an upper part of the printer main body 2, an ejected sheet tray 4 is arranged. Incidentally, on a front face of the printer main body 2, an openable/closable cover part 5 is attached and, by opening this cover part 5, an attached part 6 (refer to FIGS. 2 and 3) for the sheet feeding cartridge 3 is exposed and the sheet feeding cartridge 3 can become attachable/detachable with respect to the attached part 6.

Figure 3:
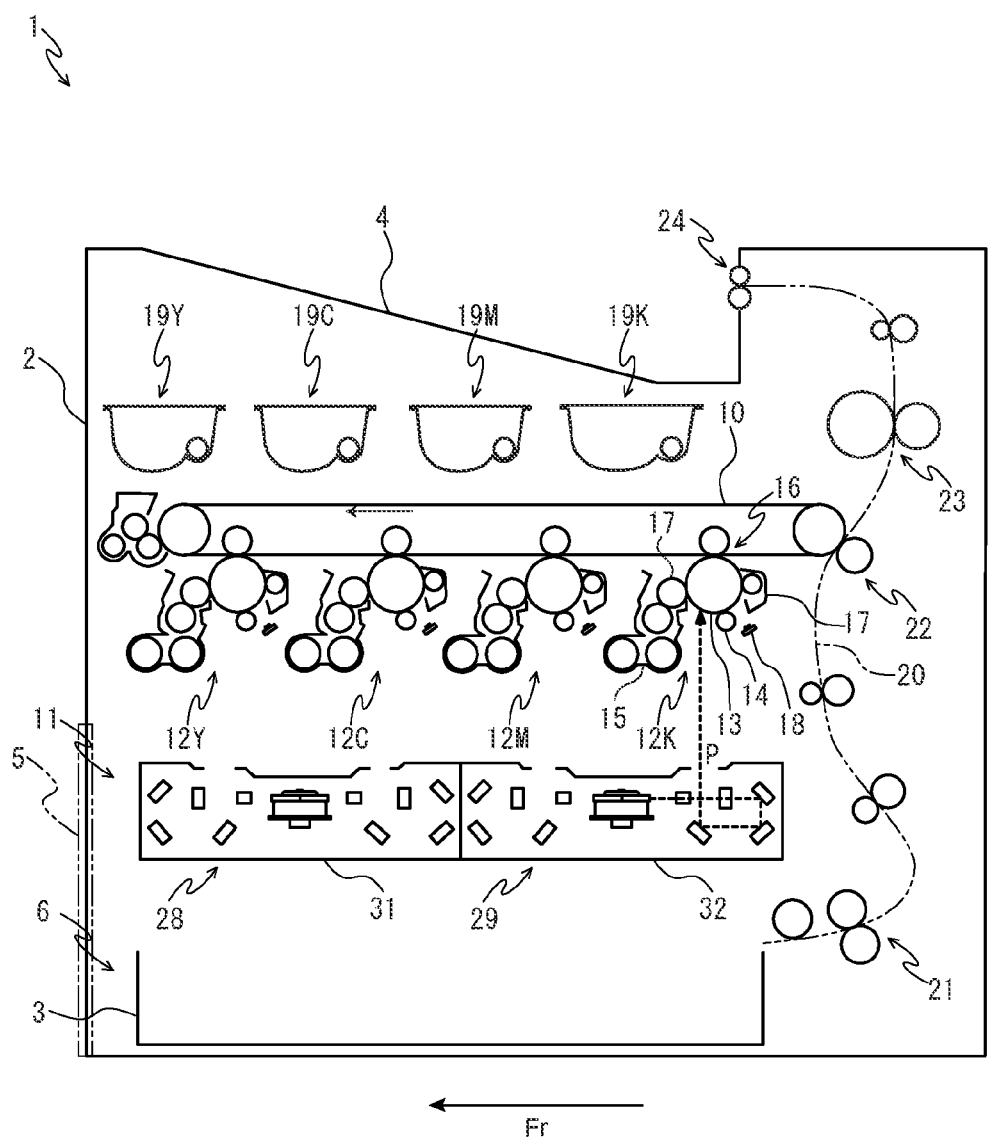
FIG. 3 It is a sectional view showing the printer in accordance with the embodiment of the present invention.

In a center part of the printer main body 2, as shown in FIG. 3, an intermediate transferring belt 6 in a longitudinal shape in forward and backward directions is disposed around a plurality of rollers and, below the intermediate transferring belt 10, an optical scanning device 11 composed of a laser scanning unit (LSU) or the like is arranged. The detail of the optical scanning device 11 will be described below.

Near the intermediate transferring belt 10, four image forming parts 12 are installed for respective colors (e.g. four colors of magenta, cyan, yellow and black) of toners along a lower part of the intermediate transferring belt 10. Incidentally, in the specification and the figures, to components corresponding to the toners of four colors of yellow, cyan, magenta and black, marks of Y, C, M and K are suitably applied, for example, the image forming parts 12 are expressed as the image forming parts 12Y, 12C, 12M and 12K.

In each image forming part 12, a photosensitive drum 13 (an image carrier) is rotatably arranged and, around the photosensitive drum 13, a charger 14, a development device 15, a first transferring part 16, a cleaning device 17 and a static eliminator 18 are located in order of first transferring processes. Above the development device 15, four toner cases 19 (19Y, 19C, 19M, 19K), such as toner containers, corresponding to the respective image forming parts 12 are arranged for the respective toner colors.

At one side (e.g. a rear part) of the printer main body 2, a conveying path 20 for the sheet is positioned. At an upstream end of the conveying path 20, a sheet feeding part 21 is positioned, at an intermediate stream part of the conveying path 20, a second transferring part is positioned at one end (e.g. a rear end) of the intermediate transferring belt 10, at a downstream part of the conveying path 20, a fixing device 23 is positioned and, at a downstream end of the conveying path 20, an ejecting part 24 is positioned.

Next, image forming operation of the printer 1 including such a structure will be described. When the power is supplied to the color printer 1, various parameters are initialized and initial determination, such as temperature determination of the fixing device 23, is carried out. Subsequently, when image data is inputted and a printing start is directed from a computer or the like connected with the color printer 1, image forming operation is carried out as follows.

First, after the surface of the photosensitive drum 13 is electric-charged by the charger 14, an electrostatic latent image is formed on the surface of the photosensitive drum 13 by a laser light (refer to an arrow P) from the optical scanning device 11. Subsequently, the development device 15 develops this electrostatic latent image to a toner image having a correspondent color by the toner supplied from the toner case 19. This toner image is first-transferred onto the surface of the intermediate transferring belt 10 in the first transferring part 16. The above-mentioned operation is repeated in order by the respective image forming parts 12, thereby forming the toner image having full color onto the intermediate transferring belt 10. Incidentally, toner and electric charge remained on the photosensitive drum 13 are removed by the cleaning device 17 and static eliminator 18.

On the other hand, the sheet taken out from the sheet feeding cartridge 3 or a manual feeding tray (not shown) by the sheet feeding part 21 is conveyed to the second transferring part 22 in a suitable timing for the above-mentioned image forming operation and, in the second transferring part 22, the toner image having full color on the intermediate transferring belt 10 is second-transferred onto the sheet. The sheet with the second-transferred toner image is conveyed to a downstream side on the conveying path 20 to enter the fixing device 23 and the toner image is fixed on the sheet in the fixing device 23. The sheet with the fixed toner image is ejected from the ejecting part 24 onto the ejected sheet tray 4.

Next, the optical scanning device 11 will be described with reference to FIGS. 3-11. As shown in FIGS. 3-5, 11 and other figures, the optical scanning device 11 includes a first optical scanning unit 28 corresponding to two front image forming parts 12 (i.e. the image forming part 12Y for yellow and the image forming part 12C for cyan) and a second optical scanning unit 29 corresponding to two rear image forming parts 12 (i.e. the image forming part 12M for magenta and the image forming part 12K for black). The first optical scanning unit 28 and the second optical scanning unit 29 are configured to include below-mentioned components in respective housing 30 and housing 31 (refer to FIG. 3).

As shown in FIGS. 4-7 and other figures, the first optical scanning unit 28 includes a light source 32Y, a collimator lens 33Y and a cylindrical lens 34Y for yellow and a light source 32C, a collimator lens 33C and a cylindrical lens 34C for cyan. The second optical scanning unit 29 includes a light source 32M, a collimator lens 33M and a cylindrical lens 34M for magenta and a light source 32K, a collimator lens 33K and a cylindrical lens 34K for black.

Moreover, as shown in FIGS. 4-7, 10, 11 and other figures, the first optical scanning unit 28 includes a first deflector 35 and a first deflector driving part 36 and the second optical scanning unit 29 includes a second deflector 37 and a second deflector driving part 38.

Further, the first optical scanning unit 28 includes a first fθ lens (a first scanning lens) 40Y, a second fθ lens (a second scanning lens) 41Y, a fixed mirror 42Y, a first reflection mirror part 43Y, a second reflection mirror part 44Y and an inclination adjusting part 45Y for yellow. In addition, the first optical scanning unit 28 includes a first fθ lens 40C, a second fθ lens 41C, a fixed mirror 42C, a first reflection mirror part 43C, a second reflection mirror part 44C and an inclination adjusting part 45C for cyan.

Further, the second optical scanning unit 29 includes a first fθ lens 40M, a second fθ lens 41M, a fixed mirror 42M, a first reflection mirror part 43M, a second reflection mirror part 44M and an inclination adjusting part 45M for magenta. In addition, the second optical scanning unit 29 includes a first fθ lens 40K, a second fθ lens 41K, a fixed mirror 42K, a first reflection mirror part 43K, a second reflection mirror part 44K and an inclination adjusting part 45K for black.

In the following, each component of the first optical scanning unit 28 and the second optical scanning unit 29 will be described in detail.

The light source 32Y, the collimator lens 33Y and the cylindrical lens 34Y are arranged, for example, at a front part and a right side of the first optical scanning unit 28. The light source 32Y is configured so as to input the laser light to the first deflector 35 by using a laser diode or the like outputting the laser light. The collimator lens 33Y and the cylindrical lens 34Y are arranged on an optical axis of the laser light outputted between the light source 32Y and the first deflector 35 from the light source 32Y in this order.

The light source 32C, the collimator lens 33C and the cylindrical lens 34C are configured similar to the light source 32Y, the collimator lens 33Y and the cylindrical lens 34Y, but arranged, for example, at a rear part of the first optical scanning unit 28. The light source 32M, the collimator lens 33M and the cylindrical lens 34M are also configured similar to the light source 32Y, the collimator lens 33Y and the cylindrical lens 34Y, but arranged, for example, at a front part of the second optical scanning unit 29. The light source 32K, the collimator lens 33K and the cylindrical lens 34K are also configured similar to the light source 32Y, the collimator lens 33Y and the cylindrical lens 34Y, but arranged, for example, at a rear part of the second optical scanning unit 29.

The first deflector 35 and the first deflector driving part 36 are arranged, for example, at a center part of the first optical scanning unit 28 and the second deflector 37 and the second deflector driving part 38 are arranged, for example, at a center part of the second optical scanning unit 29. The first deflector 35 and the second deflector 37 are composed of polygon mirrors or the like deflecting the laser lights from the light sources 32Y, 32C, 32M and 32K, and the first deflector driving part 36 and the second deflector driving part 38 are composed of motors or the like. The first deflector 35 and the second deflector 37 are respectively attached to the first deflector driving part 36 and the second deflector driving part 38, and are driven and rotated by the first deflector driving part 36 and the second deflector driving part 38.

The first fθ lens 40Y, the second fθ lens 41Y and the fixed mirror 42Y are arranged, for example, at the front part of the first optical scanning unit 28 on an optical axis of the laser light deflected by the first deflector 35 in this order. The first fθ lens 40Y and the second fθ lens 41Y are formed in a longitudinal shape in left and right directions and an arc shape bulged forwardly, and configured so as to concentrate the laser light outputted from the light source 32Y and deflected by the first deflector 35. The fixed mirror 42Y is configured so as to reflect the laser light via the first fθ lens 40Y and the second fθ lens 41Y toward the first reflection mirror part 43Y (e.g. toward a downward direction).

The first fθ lens 40C, the second fθ lens 41C and the fixed mirror 42C are configured similar to the first fθ lens 40Y, the second fθ lens 41Y and the fixed mirror 42Y are, but arranged at the rear part of the first optical scanning unit 28, and the first fθ lens 40C and the second fθ lens 41C are formed in an arc shape bulged backwardly. The first fθ lens 40M, the second fθ lens 41M and the fixed mirror 42M are also configured similar to the first fθ lens 40Y, the second fθ lens 41Y and the fixed mirror 42Y are, but arranged at the front part of the second optical scanning unit 29, and the first fθ lens 40M and the second fθ lens 41M are formed in an arc shape bulged forwardly. The first fθ lens 40K, the second fθ lens 41K and the fixed mirror 42K are also configured similar to the first fθ lens 40Y, the second fθ lens 41Y and the fixed mirror 42Y are, but arranged at the rear part of the second optical scanning unit 29, and the first fθ lens 40K and the second fθ lens 41K are formed in an arc shape bulged backwardly.

The first reflection mirror part 43Y is arranged, for example, below the fixed mirror 42Y. The first reflection mirror part 43Y is a longitudinal mirror, in which metal, such as aluminum, is vapor-deposited on a glass substrate in a rectangular flat shape elongated in a main-scanning direction (the left and right directions), and configured so as to adjust scanning curve of the laser light reflected by the fixed mirror 42Y with respect to the photosensitive drum 13 and to further reflect this laser light toward the second reflection mirror part 44Y (e.g. toward the backward direction). As a mechanism adjusting the scanning curve of the first reflection mirror part 43Y, a known scanning curve adjustment mechanism may be applied. The scanning curve adjustment mechanism may be configured, for example, so as to bulge the first reflection mirror part 43Y by pressing any position in the main-scanning direction in the first reflection mirror part 43Y. The first reflection mirror parts 43C, 43M and 43K are also configured similar to the first reflection mirror part 43Y, but, for example, the first reflection mirror parts 43C and 43K reflect the laser light toward the forward direction.

The second reflection mirror part 44Y is arranged, for example, at a back side of the first reflection mirror part 43Y. The second reflection mirror part 44Y is a longitudinal mirror, in which metal, such as aluminum, is vapor-deposited on a glass substrate in a rectangular flat shape elongated in the main-scanning direction (the left and right directions), and configured so as to adjust scanning inclination of the laser light reflected by the first reflection mirror part 43Y with respect to the photosensitive drum 13 and to further reflect this laser light toward the photosensitive drum 13 of the image forming part 12Y (e.g. toward an upward direction).

Figure 8:
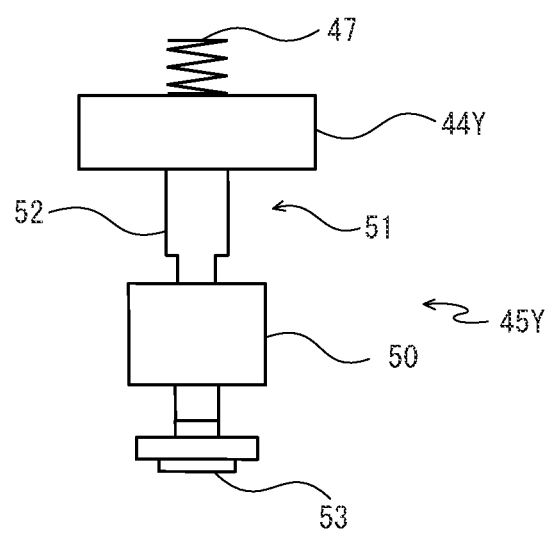
FIG. 8 It is a sectional view showing a second reflection mirror of the optical scanning device viewed from one end side in the printer in accordance with the embodiment of the present invention.
Figure 9:
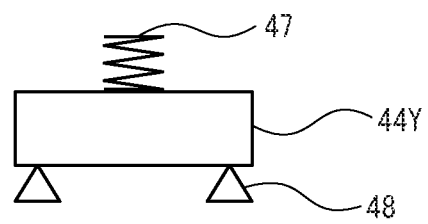
FIG. 9 It is a sectional view showing the second reflection mirror of the optical scanning device viewed from another end side in the printer in accordance with the embodiment of the present invention.

Further, the second reflection mirror part 44Y is, as shown in FIGS. 8 and 9, attached so that both end sides in the left and right directions on a reflection face to the laser light are pressed by receiving a biasing force of a biasing member 47 fixed to the housing 30 of the first optical scanning unit 28. As the biasing member 47, for example, a plate spring is applied. Moreover, the second reflection mirror part 44Y is attached so that, on a back face to the reflection face, the inclination adjusting part 45Y is arranged at one end side (a right side) and another end side (a left side) is fixed by a fixing member 48 fixed to the housing 30 of the first optical scanning unit 28. That is, the second reflection mirror part 44Y configured so that one end side is displaced in an orthogonal direction to the reflection face with respect to another end side as a fulcrum by the inclination adjusting part 45Y.

The second reflection mirror parts 44C, 44M and 44K are also configured similar to the second reflection mirror part 44Y, but, for example, the second reflection mirror part 44C is arranged in front of the first reflection mirror part 43C and the second reflection mirror part 44K is arranged in front of the first reflection mirror part 43K.

The inclination adjusting part 45Y makes one end side of the second reflection mirror part 44Y displace and, for example, as shown in FIGS. 6, 7, 8, 11 and other figures, includes a worm wheel 50 and a contact member 51.

The worm wheel 50 is in a roughly cylindrical shape and has a plurality of teeth (not shown) at predetermined intervals along its outer circumference, and an internal screw thread (not shown) is formed on its inner circumference. Moreover, the worm wheel 50 is attached so as to be rotatable and immovable by a bearing or the like.

The contact member 51 has a shaft part 52, in which an external screw thread (not shown) is formed on an outer circumference face, and a head part 53 arranged at one end of the shaft part 52. The contact member 51 is attached so that the external screw thread of the shaft part 52 is screwed into the internal screw thread of the worm wheel 50 and another end of the shaft part 52 comes into contact with one end side of the back face of the second reflection mirror part 44Y. Moreover, on the head part 53 of the contact member 51, a cross recess for a Phillips head screwdriver is formed. Alternatively, on the head part 53, in place of this cross recess, a slitting for a flathead screwdriver or a hexagon socket for a hexagonal wrench may be formed.

The inclination adjusting part 45Y moves in a rotation axial direction while the shaft part 52 of the contact member 51 is rotated according to rotation of the worm wheel 50 and another end of the shaft part 52 is displaced. The inclination adjusting part 45Y can displace one end side of the second reflection mirror part 44Y in accordance with displacement of another end of the shaft part 52. Moreover, the inclination adjusting part 45Y can rotate the contact member 51 by acting a tool, such as a screwdriver, on the cross recess of the head part 53 of the contact member 51.

The inclination adjusting part 45C, 45M and 45K are also configured similar to the inclination adjusting part 45Y. However, the inclination adjusting part 45K may apply, as a member screwed to the contact member 51, another member having the internal screw thread except for the worm wheel 50.

Next, an operation outputting the laser light toward the photosensitive drum 13 in the optical scanning device 11 will be described with reference to FIG. 11. Here, the operation in the first optical scanning unit 28 will be described and description of the operation in the second optical scanning unit 29 is omitted, but the second optical scanning unit 29 works similar to the first optical scanning unit 28.

First, in the first optical scanning unit 28, the laser light outputted from the light source 32Y reaches the first deflector 35 via the collimator lens 33Y and the cylindrical lens 34Y. Similarly, the laser light outputted from the light source 32C reaches the first deflector 35 via the collimator lens 33C and the cylindrical lens 34C.

Figure 11:
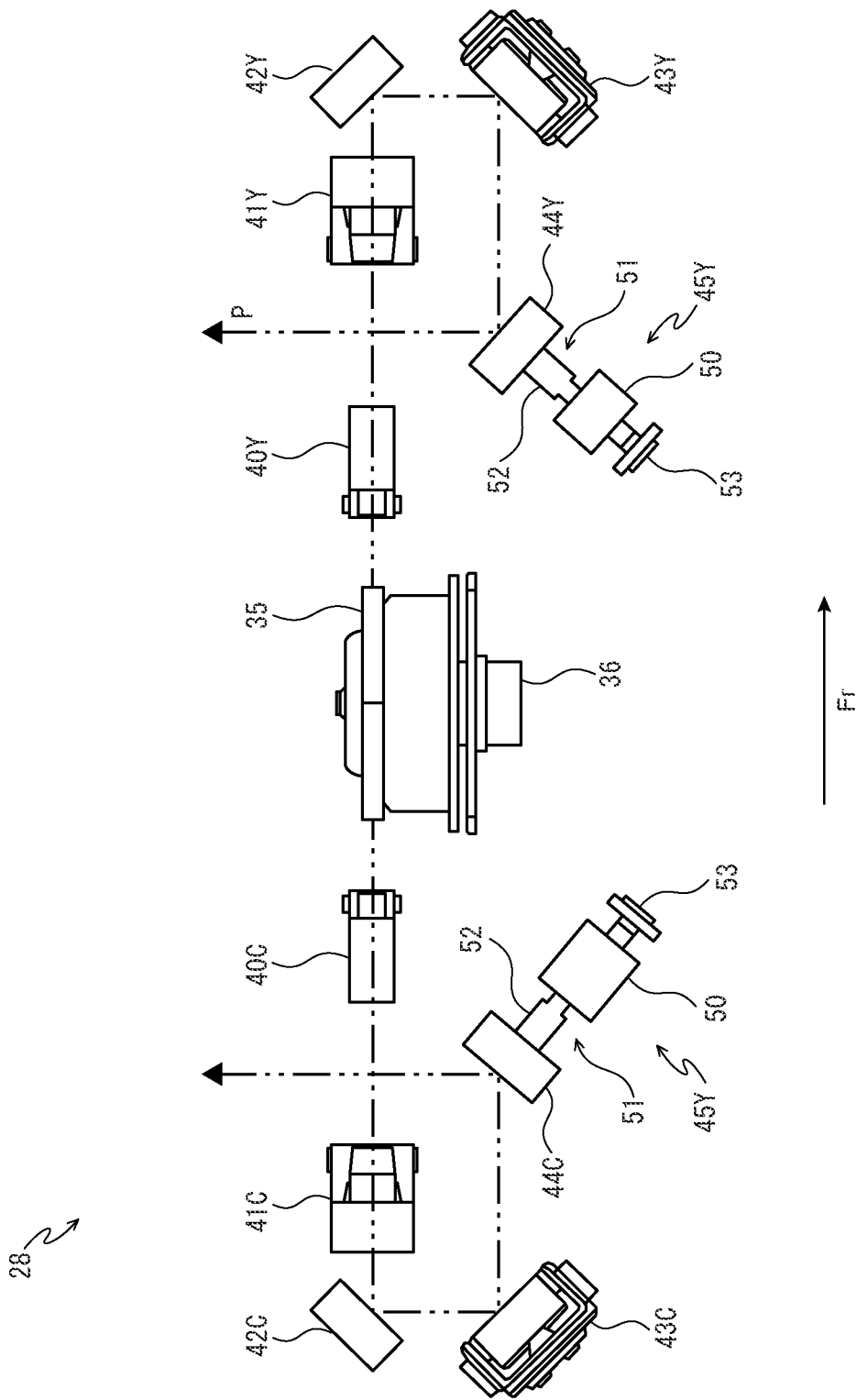
FIG. 11 It is a schematic diagram showing a printer in a state, where a laser light is conducted in the first optical scanning unit of the optical scanning device, in accordance with an embodiment of the present invention.

The laser light from the light source 32Y is deflected forwardly by the first deflector 35 and, as shown in FIG. 11, reaches the fixed mirror 42Y while being concentrated by the first fθ lens 40Y and the second fθ lens 41Y. Similarly, the laser light from the light source 32C is deflected backwardly by the first deflector and reaches the fixed mirror 42C while being concentrated by the first fθ lens 40C and the second fθ lens 41C.

Moreover, the laser light from the light source 32Y is reflected downwardly by the fixed mirror 42Y to reach the first reflection mirror part 43Y and is further reflected backwardly here, while the scanning curve is adjusted, to reach the second reflection mirror part 44Y. Similarly, the laser light from the light source 32C is reflected downwardly by the fixed mirror 42C to reach the first reflection mirror part 43C and is further reflected forwardly here, while the scanning curve is adjusted, to reach the second reflection mirror part 44C.

Furthermore, the laser light from the light source 32Y is further reflected upwardly, while the scanning inclination is adjusted, by the second reflection mirror part 44Y to irradiate the surface of the photosensitive drum 13 of the image forming part 12Y. Similarly, the laser light from the light source 32C is further reflected upwardly, while the scanning inclination is adjusted, by the second reflection mirror part 44C to irradiate the surface of the photosensitive drum 13 of the image forming part 12C.

Figure 4:
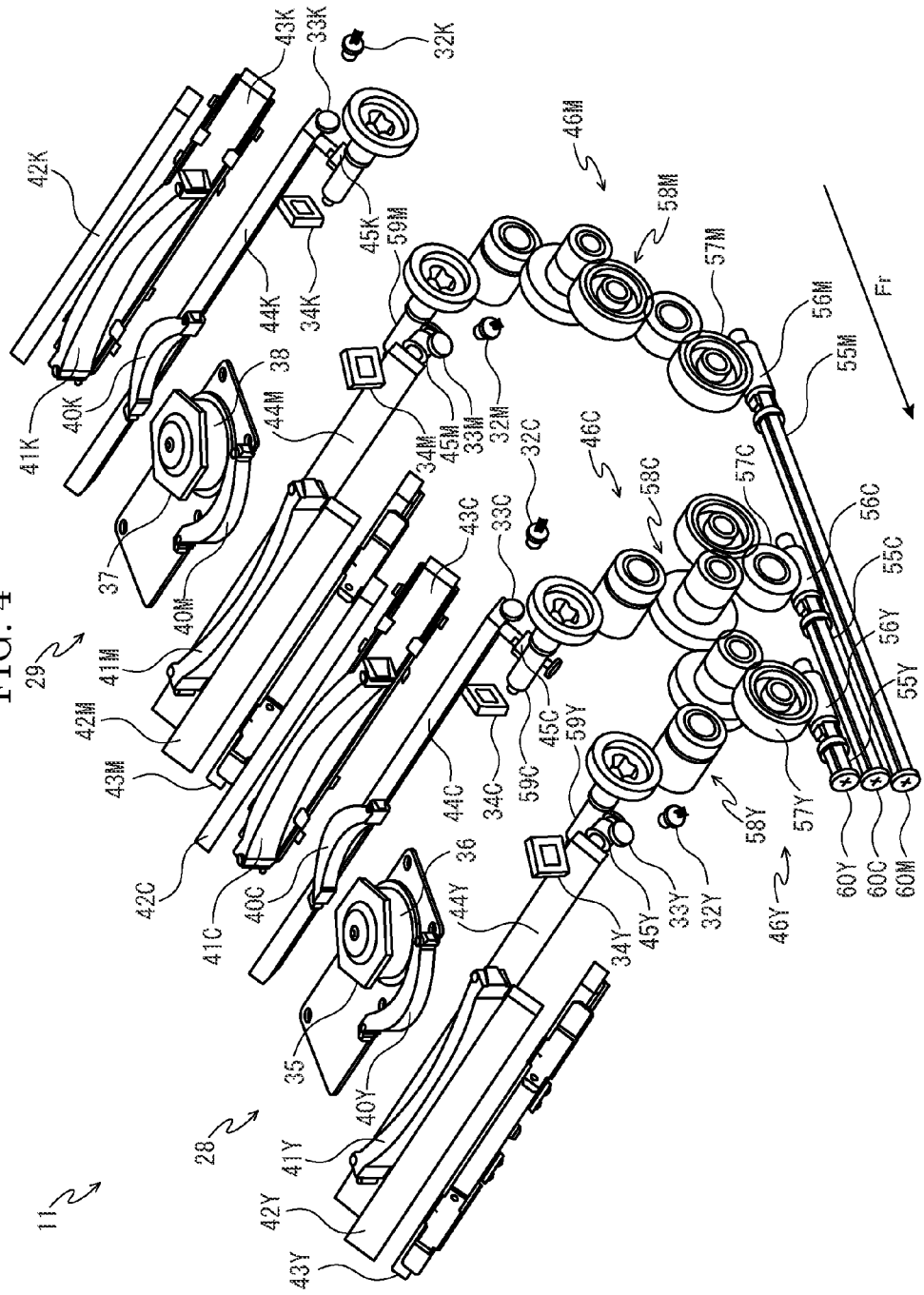
FIG. 4 It is an exploded perspective view showing an optical scanning device viewed from an upper side in the printer in accordance with the embodiment of the present invention.
Figure 5:
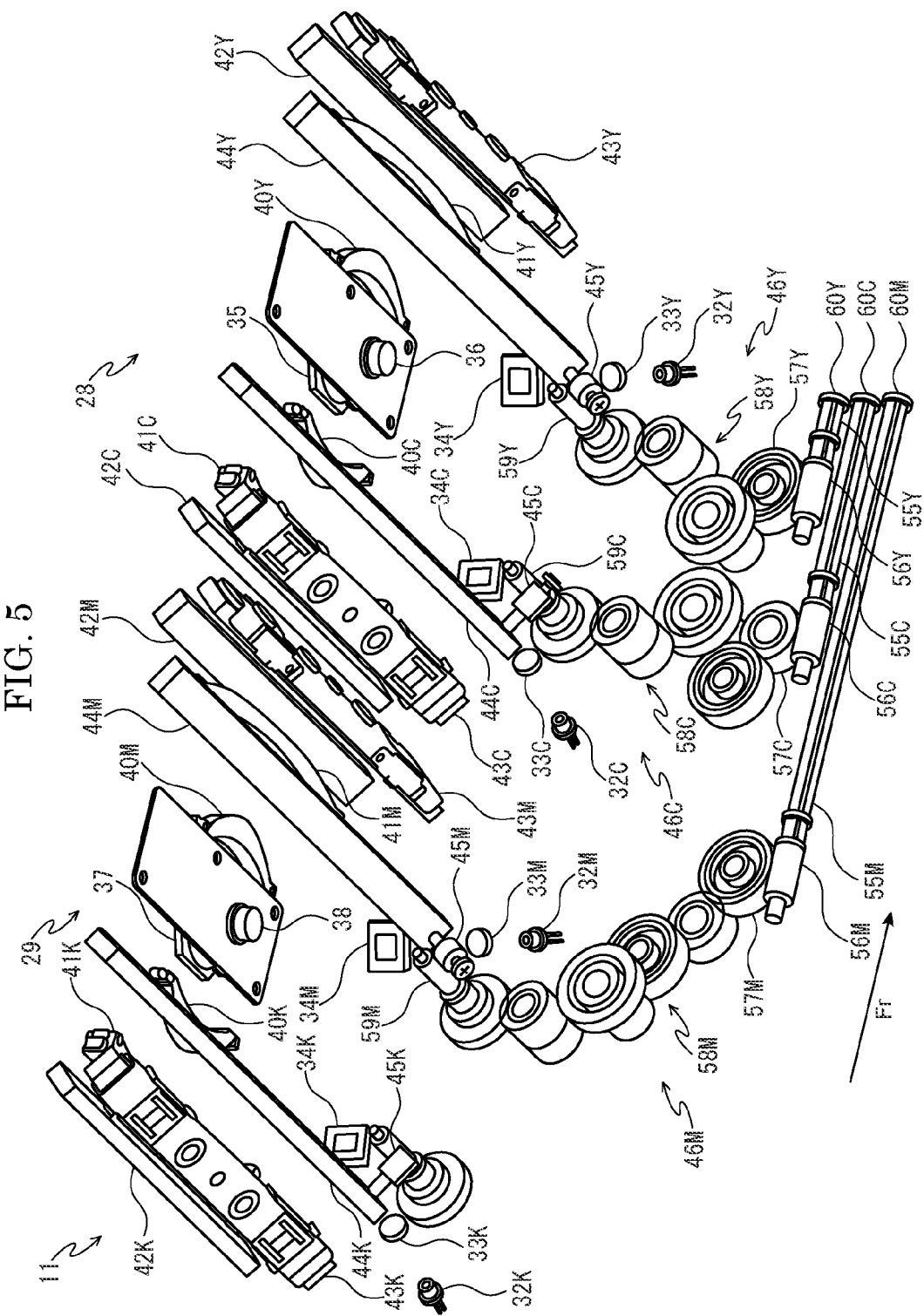
FIG. 5 It is an exploded perspective view showing the optical scanning device viewed from a lower side in the printer in accordance with the embodiment of the present invention.
Figure 6:
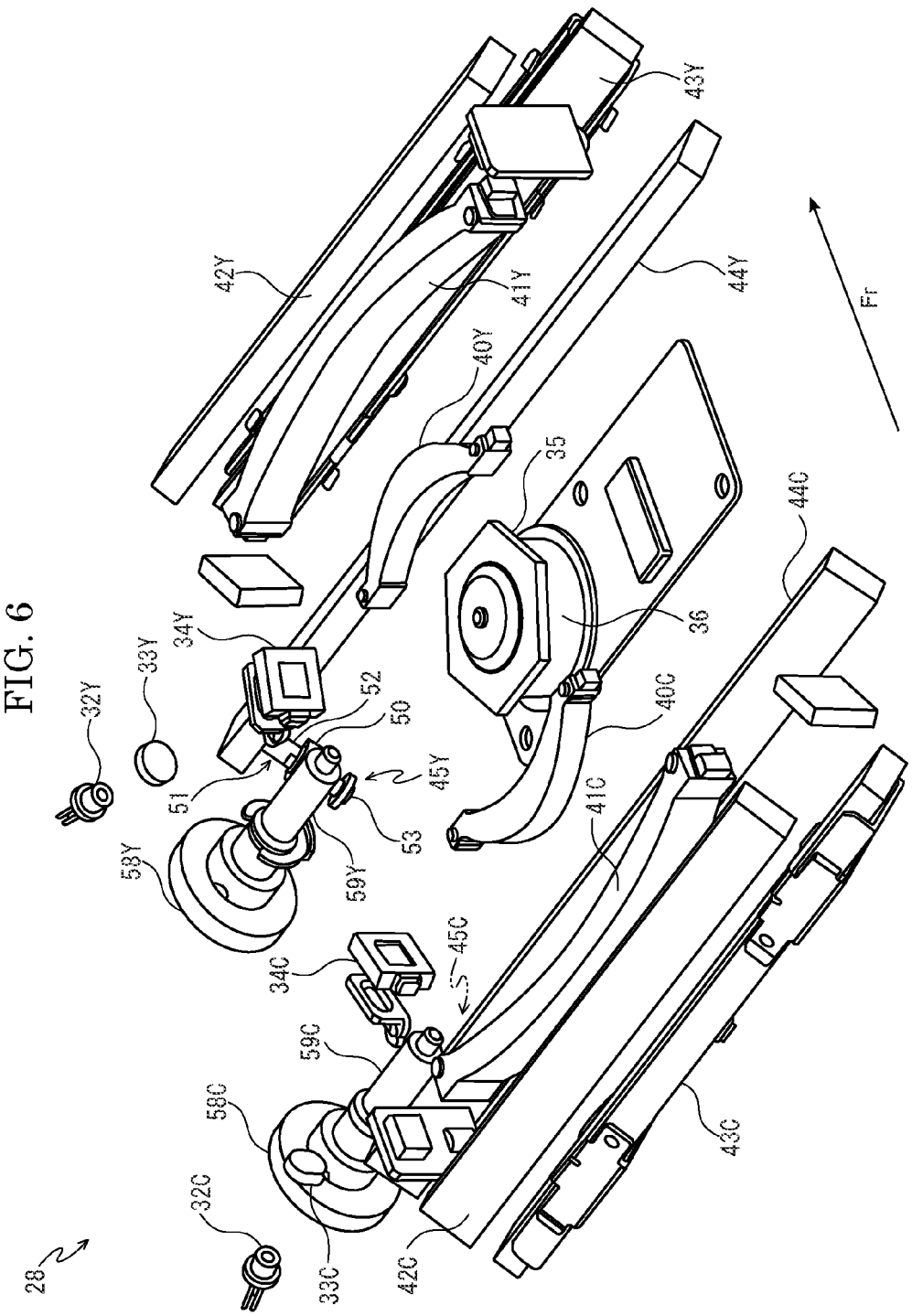
FIG. 6 It is an exploded perspective view showing a first optical scanning unit of the optical scanning device viewed from the upper side in the printer in accordance with the embodiment of the present invention.
Figure 7:
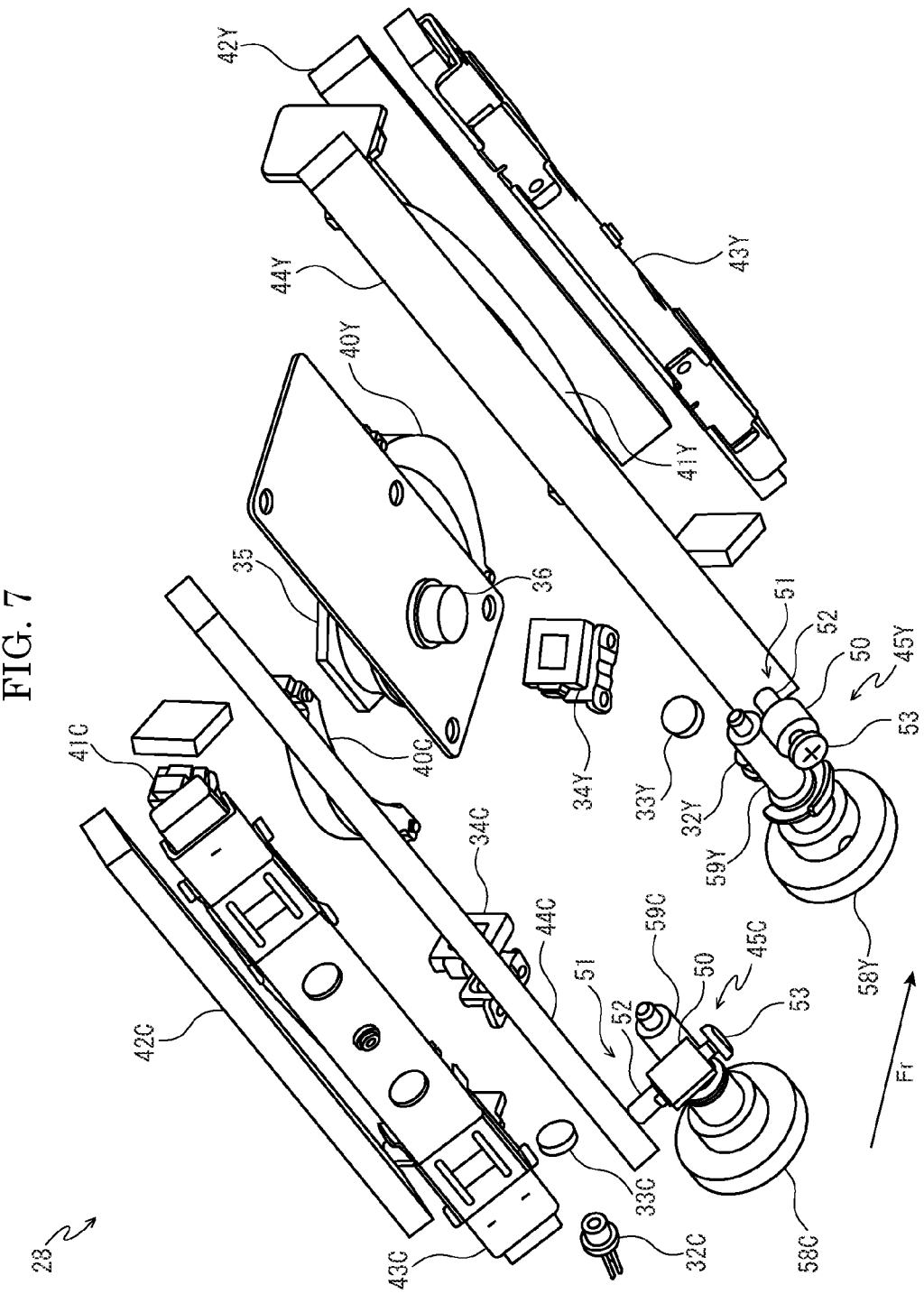
FIG. 7 It is an exploded perspective view showing the first optical scanning unit of the optical scanning device viewed from the lower side in the printer in accordance with the embodiment of the present invention.
Figure 10:
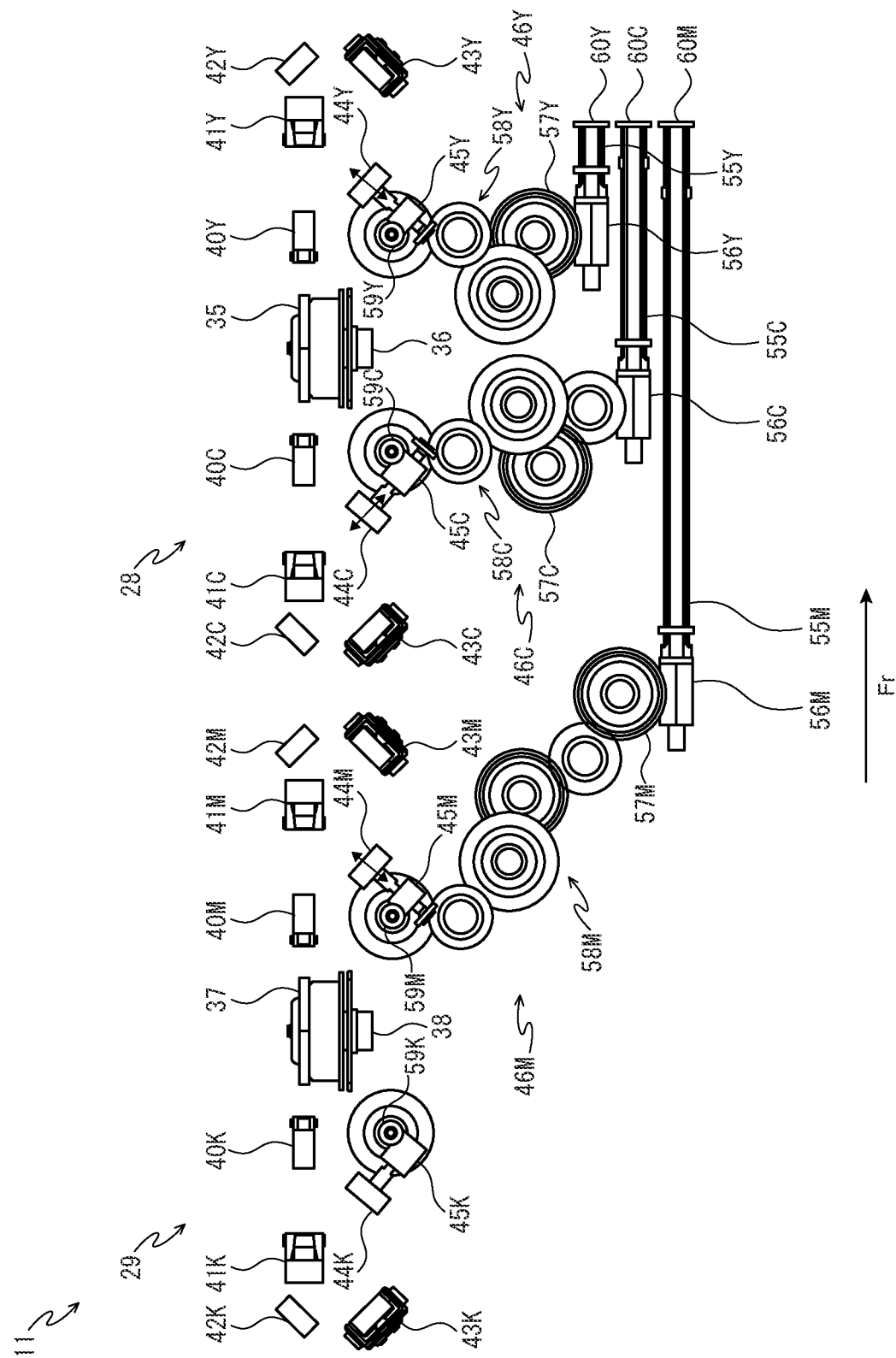
FIG. 10 It is a sectional view showing the optical scanning device in the printer in accordance with the embodiment of the present invention.

In addition, the printer main body 2 includes, as shown in FIGS. 4, 5, 10 and other figures, adjustment operation transmitting parts 46Y, 46C and 46M. The adjustment operation transmitting part 46Y is connected to the inclination adjusting part 45Y of the first optical scanning unit 28 in the optical scanning device 11, the adjustment operation transmitting part 46C is connected to the inclination adjusting part 45C of the first optical scanning unit 28 and the adjustment operation transmitting part 46M is connected to the inclination adjusting part 45M of the second optical scanning unit 29.

Incidentally, the adjustment operation transmitting parts 46Y, 46C and 46M are arranged to the inclination adjusting parts 45Y, 45C and 45M with regard to the second reflection mirror parts 44Y, 44C and 44M conducting the laser light of colors excluding a standard color (e.g. black) when forming the electrostatic latent image on the photosensitive drum 13. To the inclination adjusting part 45K of the second reflection mirror part 44K, the adjustment operation transmitting part as mentioned above is not arranged and the second reflection mirror part 44K makes the scanning inclination adjust by adjusting the inclination adjusting part 45K at a shipping time of the printer 1 or in a case where a cover of the printer main body 2 is detached.

The adjustment operation transmitting part 46Y includes, for example, an adjustment operation part 55Y, an adjustment worm 56Y, an adjustment worm wheel 57Y, a plurality of transmission gears 58Y and a transmission worm 59Y and these compose a drive train. The adjustment operation transmitting part 46Y is arranged so as to extend from a right end side of the first optical scanning unit 28 to the attached part 6 of the printer main body 2 in the upward and downward directions.

The adjustment operation part 55Y and the adjustment worm 56Y are arranged, for example, at a lower end of the adjustment operation transmitting part 46Y. The adjustment operation part 55Y is formed in a roughly columnar shape extending in the forward and backward directions, includes a head part 60Y having a cross recess for a Phillips head screwdriver at one end (a front end) and arranged so as to be rotatable around a rotation axis in the forward and backward directions. Alternatively, on the head part 60Y, in place of this cross recess, a slitting for a flathead screwdriver or a hexagon socket for a hexagonal wrench may be formed. The adjustment worm 56Y is formed to provide an external screw thread (not shown) on an outer circumference face and attached to another end (a back side) of the adjustment operation part 55Y with coaxial to the adjustment operation part 55Y (around a rotation axis in the forward and backward directions). The adjustment operation part 55Y is rotated by rotating the head part 60Y with a tool, such as a screw driver, or manual and the adjustment worm 56Y is rotated according to rotation of the adjustment operation part 55Y.

Figure 12:
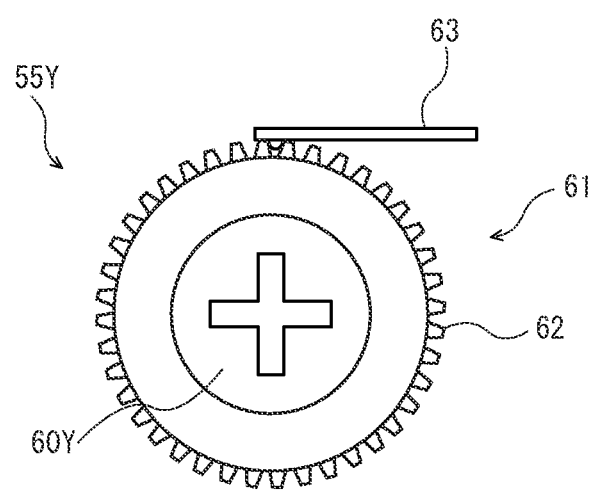
FIG. 12 It is a sectional view showing a rotation regulating mechanism of an adjustment operation transmitting part in the printer in accordance with the embodiment of the present invention.

Moreover, the adjustment operation part 55Y includes, as shown in FIGS. 11, 12 and other figures, a rotation regulating mechanism 61 regulating rotation operation by displacement at predetermined intervals. The rotation regulating mechanism 61 is configured, for example, so as to include a rotation regulating gear 62 having a plurality of grooves (i.e. a plurality of teeth) along an external circumference of the adjustment operation part 55Y and a rotation regulation engaging part biased to the rotation regulating gear 62. The rotation regulating gear 62 is attached so as to be rotated according to rotation of the head 60Y of the adjustment operation part 55Y and the rotation regulation engaging part 63 is formed, as shown in FIG. 12, to have a hemisphere formed protrusion at one end side of a plate spring. The rotation regulation engaging part 63 is generally biased so that the protrusion is fitted into the groove of the rotation regulating gear 62, but the protrusion goes through the groove of the rotation regulating gear 62 by rotation of the rotation regulating gear 62, and then, is fitted into next groove. That is, rotation operation of the adjustment operation part 55Y is regulated for each interval of the grooves of the rotation regulating gear 62 by the rotation regulating mechanism 61.

The adjustment worm wheel 57Y is arranged, for example, above the adjustment worm 56Y. The adjustment worm wheel 57Y is formed to have a plurality of teeth (not shown) at predetermined intervals and is arranged to engage this teeth to the external screw thread of the adjustment worm 56Y and to be rotatable around a rotation axis in the left and right directions. The adjustment worm wheel 57Y is provided so as to convert rotation around the rotation axis in the forward and backward directions in the adjustment worm 56Y to rotation around the rotation axis in the left and right directions.

The plurality of transmission gears 58Y are arranged, for example, from a side of the adjustment worm wheel 57Y to an upper side in order. The plurality of transmission gears 58Y are formed to have respective pluralities of teeth (not shown) at predetermined intervals and arranged rotatable around a rotation axis in the left and right directions. The plurality of transmission gears 58Y are sequentially engaged and the transmission gear 58Y at a lowermost position is engaged with the adjustment worm wheel 57Y. Although, in FIGS. 4, 5 and 10, three transmission gears 58Y are shown, it is not restricted by this and may transmits rotation force from the adjustment worm wheel 57Y to the transmission worm.

The transmission worm 59Y is arranged, for example, at a left side of the transmission gear 58Y at an uppermost position. The transmission worm 59Y has a roughly columnar shape extending in the left and right directions and provides an external screw thread (not shown) on an outer circumference face. The transmission worm 59Y is coaxially attached to the transmission gear 58Y at the uppermost position (around a rotation axis in the left and right directions) and arranged so that the external screw thread is engaged with the worm wheel 50 of the inclination adjusting part 45Y.

The adjustment operation transmitting part 46C is configured similar to the adjustment operation transmitting part 46Y, but an adjustment operation part 55C of the adjustment operation transmitting part 46C is arranged below the adjustment operation part 55Y of the adjustment operation transmitting part 46Y and an adjustment worm 56C, an adjustment worm wheel 57C, a plurality of transmission gears 58C and a transmission worm 59C of the adjustment operation transmitting part 46C are arranged at a back side of the adjustment operation transmitting part 46Y. Moreover, the adjustment operation transmitting part 46C has the transmission gears 58C, e.g. four transmission gears 58C, more than the adjustment operation transmitting part 46Y. Incidentally, a head part 60C of the adjustment operation part 55C is arranged side by side with the head part 60Y of the adjustment operation part 55Y in the upward and downward directions.

The adjustment operation transmitting part 46M is also configured similar to the adjustment operation transmitting part 46Y, but an adjustment operation part 55M of the adjustment operation transmitting part 46M is arranged below the adjustment operation part 55C of the adjustment operation transmitting part 46C and an adjustment worm 56M, an adjustment worm wheel 57M, a plurality of transmission gears 58M and a transmission worm 59M of the adjustment operation transmitting part 46M are arranged at a back side of the adjustment operation transmitting part 46C. Moreover, the adjustment operation transmitting part 46M has the transmission gears 58M, e.g. five transmission gears 58M, more than the adjustment operation transmitting part 46Y and the adjustment operation transmitting part 46C. Incidentally, a head part 60M of the adjustment operation part 55M of the adjustment operation transmitting part 46M is arranged side by side with the head parts 60Y and 60C of the adjustment operation parts 55Y and 55C of the adjustment operation transmitting part 46Y and the adjustment operation transmitting part 46C in the upward and downward directions.

Figure 13:
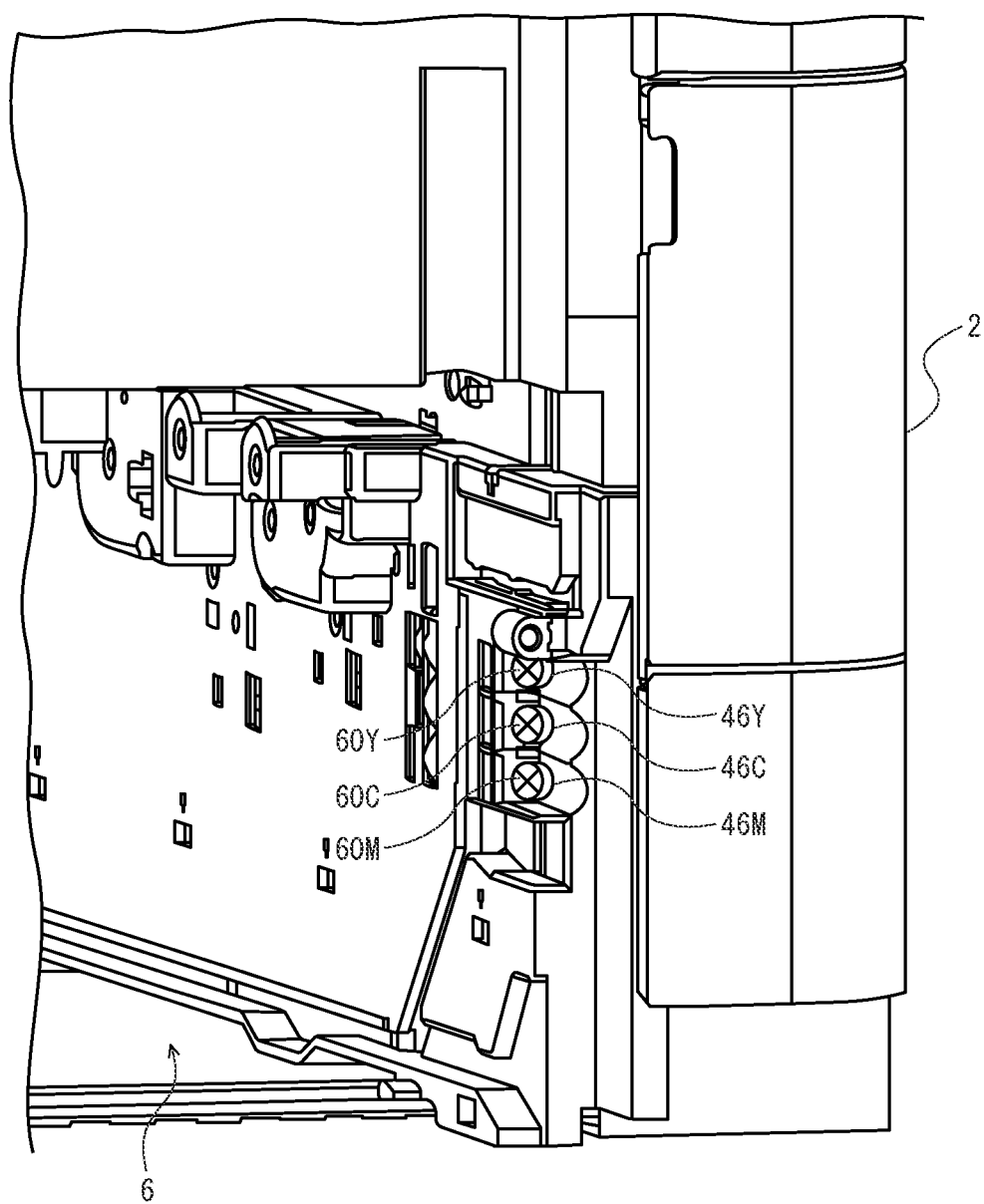
FIG. 13 It is an enlarged view showing the printer in a state, where the cover part is detached, in accordance with the embodiment of the present invention.

Moreover, the head parts 60Y, 60C and 60M of the adjustment operation parts 55Y, 55C and 55M of the adjustment operation transmitting parts 46Y, 46C and 46M are arranged, as shown in FIG. 13, so as to be exposed so as to be operatable from the outside in a state where the cover part 5 of the printer main body 2 is opened and the sheet feeding cartridge 3 is detached from the attached part 6. For example, the head parts 60Y, 60C and 60M are configured so as to be capable of rotation operation from a direction drawing out the sheet feeding cartridge 3 from the attached part 6.

Next, an operation adjusting the second reflection mirror part 44Y of the first optical scanning unit 28 of the optical scanning device 11 by the adjustment operation transmitting part 46Y will be described.

First, an operator opens the cover part 5 of the printer main body 2 and detaches the sheet feeding cartridge 3 from the attached part 6 to expose the head parts 60Y, 60C and 60M of the adjustment operation parts 55Y, 55C and 55M of the adjustment operation transmitting parts 46Y, 46C and 46M. Hereinafter, an example that the operator rotates the head part 60Y around the rotation axis in the forward and backward directions by the tool, such as the screw driver, or manual will be described. When the head part 60Y is rotated, the adjustment worm 56Y is rotated together with the adjustment operation parts 55Y.

Incidentally, at this time, since rotation of the adjustment operation parts 55Y is regulated by the rotation regulating mechanism 61, it is displaced for each interval of the grooves of the rotation regulating gear 62.

Rotation of the adjustment worm 56Y around the rotation axis in the forward and backward directions is converted to rotation around the rotation axis in the left and right directions by the adjustment worm wheel 57Y engaged with the adjustment worm 56Y and the adjustment worm wheel 57Y is rotated.

Rotation of the adjustment worm wheel 57Y is transmitted to the transmission worm 59Y attached to the transmission gear 58Y at the uppermost position via the plurality of transmission gears 58Y engaged sequentially and the transmission worm 59Y is also rotated around the rotation axis in the left and right directions.

Rotation of the transmission worm 59Y around the rotation axis in the left and right directions is converted to rotation around a different rotation axis by the worm wheel 50 of the inclination adjusting part 45Y engaged with the transmission worm 59Y and the worm wheel 50 is rotated.

Subsequently, the external screw thread of the contact member 51 is rotated according to rotation of the internal screw thread of the worm wheel 50 and the contact member 51 is moved in a direction pressing or separating with respect to the back face of the second reflection mirror part 44Y. Thereby, in the second reflection mirror part 44Y, one end side is displaced in an orthogonal direction to its reflection face with regard to another end side as a fulcrum, for example, displaced to a back face side by receiving the biasing force of the biasing member 47 or displaced to a reflection face side against this biasing force.

In the above-mention, an example of adjusting inclination of the second reflection mirror part 44Y via the adjustment operation transmitting part 46Y by rotating the head part 60Y of the adjustment operation part 55Y is described, but, in a case of rotating the head part 60C or 60M of the adjustment operation part 55C or 55M, similarly, inclination of the second reflection mirror part 44C or 44M is adjusted via the adjustment operation transmitting part 46C or 46M.

In accordance with the present embodiment, as mentioned above, in the printer 1 as the image forming apparatus of the present invention, the optical scanning device 11 is configured to include the first deflector 35 and the second deflector 37 (a deflector) deflecting the laser light scanning the photosensitive drum 13 (the image carrier) outputted from the light source 32Y, 32C, 32M and 32K, the first reflection mirror parts 43Y, 43C, 43M and 43K adjusting the scanning curve of the laser light deflected by the first deflector 35 and the second deflector 37, and the second reflection mirror parts 44Y, 44C, 44M and 44K arranged at a downstream side from the first reflection mirror parts 43Y, 43C, 43M and 43K in an optical path of the laser light to adjust the scanning inclination of the laser light.

Thereby, since adjustment of the scanning curve and adjustment of the scanning inclination of the laser light are carried out respective different mirrors (the first reflection mirror parts 43Y, 43C, 43M and 43K and the second reflection mirror parts 44Y, 44C, 44M and 44K), as compared with a configuration adjusting the scanning curve and the scanning inclination by one optical element, it is unnecessary to enlarge the optical element, such as a mirror, each adjustment is simplified and influence another adjustment caused by one adjustment is decreased. Therefore, it is possible to simplify and minimize an adjustment mechanism of the scanning curve and the scanning inclination, and further, to prevent adjustment from being repeated. Accordingly, it is possible to minimize the entire the optical scanning device 11 and to shorten adjustment time of the scanning curve and the scanning inclination.

Moreover, for example, even if a second reflection mirror part for scanning inclination adjustment were arranged at an upstream side from a first reflection mirror part for scanning curve adjustment, it is necessary to construct the first reflection mirror part at a side near the photosensitive drum by using a mirror with a large width in a sub-scanning direction (a short direction), in order to securely lead the laser light to the photosensitive drum. However, in the present embodiment, the first reflection mirror parts 43Y, 43C, 43M and 43K for scanning curve adjustment are arranged at the upstream side from the second reflection mirror parts 44Y, 44C, 44M and 44K for scanning inclination adjustment and the scanning inclination is adjusted by the mirrors 44Y, 44C, 44M and 44K at the side near the photosensitive drum 13. Therefore, even if displacement of an optical axis due to scanning inclination adjustment in the second reflection mirror parts 44Y, 44C, 44M and 44K occurs, this does not influence scanning curve adjustment in the first reflection mirror parts 43Y, 43C, 43M and 43K. Accordingly, it is possible to construct the first reflection mirror parts 43Y, 43C, 43M and 43K and the second reflection mirror parts 44Y, 44C, 44M and 44K by using mirrors having a small width in the sub-scanning direction.

As mentioned above, in the printer 1 of the present embodiment, it is possible to simplify an adjustment mechanism to the scanning curve and the scanning inclination caused in the optical scanning device and to shorten the adjustment time of the scanning curve and the scanning inclination. Further, it is possible to design low costing, minimizing and weight saving of the optical scanning device 11.

Moreover, since the first deflector 35 and the second deflector 37 and scanning lenses, such as the first fθ lenses 40Y, 40C, 40M and 40K and the second fθ lenses 41Y, 41C, 41M and 41K, are arranged at the upstream side from the first reflection mirror parts 43Y, 43C, 43M and 43K, it is possible to restrain the scanning curve caused by an axis tilt of the deflector or inclination of the scanning lens in advance and to decrease influence degree of these causes. Further, since the first reflection mirror parts 43Y, 43C, 43M and 43K and the second reflection mirror parts 44Y, 44C, 44M and 44K are composed by vapor-depositing the metal on the glass substrate, it is possible to obtain color registration performance with sequential stable in image forming after adjustment. In addition, since the first reflection mirror parts 43Y, 43C, 43M and 43K and the second reflection mirror parts 44Y, 44C, 44M and 44K are mirrors in rectangular flat shapes, for example, as compared with a case of applying a cylindrical mirror as a mirror for adjusting the scanning curve or the scanning inclination, it is possible to reduce cost.

Moreover, in accordance with the present embodiment, in the optical scanning device 11, the second reflection mirror parts 44Y, 44C and 44M is configured to that one end is fixed and another end can be displaced in the orthogonal direction to the reflection face. Therefore, it is possible to simply construct the inclination adjusting parts 45Y, 45C and 45M adjusting the displacement of the second reflection mirror parts 44Y, 44C and 44M.

Moreover, in accordance with the present embodiment, the printer 1 as the image forming apparatus is configured to includes the printer main body 2 (an apparatus main body), the sheet feeding cartridge 3 arranged attachably/detachably with respect to the printer main body 2 and storing the sheets, the above-mentioned optical scanning device 11 arranged inside the printer main body 2 and the adjustment operation transmitting parts 46Y, 46C and 46M (a transmitting part) having one end part exposed in a state where the sheet feeding cartridge 3 is detached from the printer main body 2 and another end part connected to the second reflection mirror parts 44Y, 44C and 44M of the optical scanning device 11 and transmitting adjustment operation of the second reflection mirror parts 44Y, 44C and 44M from one end part to another end part.

Thereby, it is possible to adjusting the scanning inclination of the second reflection mirror parts 44Y, 44C and 44M by a simple way through the adjustment operation transmitting parts 46Y, 46C and 46M without dismantling the printer main body 2.

Moreover, in accordance with the present embodiment, the adjustment operation transmitting parts 46Y, 46C and 46M are configured so as to transmit rotation force from one end part to another end part and to adjust and operate the second reflection mirror parts 44Y, 44C and 44M by utilizing this rotation force, and one end part of the adjustment operation transmitting part 46Y, 46C or 46M is the adjustment operation part 55Y receiving rotation operation and producing rotation force to include the rotation regulating mechanism 61 regulating the rotation operation for each predetermined interval.

Thereby, the operator can rotate and operate the adjustment operation part 55Y, while obtain click feeling, by regulation of the rotating operation by the rotation regulating mechanism 61 and can finely adjust the second reflection mirror parts 44Y, 44C and 44M for each predetermined amount. In addition, it is possible to prevent rotation of the adjustment operation part 55Y caused by oscillation or the like regardless of an intention of the operator and displacement of the second reflection mirror parts 44Y, 44C and 44M caused by the biasing force of the biasing member 47.

Although, in the present embodiment, a configuration that the rotation regulating mechanism 61 includes the rotation regulating gear 62 and the rotation regulation engaging part 63 was described, it is not restricted by this configuration and may be a mechanism capable of adjusting the rotation of the adjustment operation part 55Y, while obtaining the click feeling, for each predetermined interval.

Although, in the embodiment, a case of applying the configuration of the present invention to the printer performing color image forming in a tandem-type was described, in another different embodiment, the configuration of the present invention may be applied to various image forming apparatuses, such as another printer performing color image forming in a rotary-type or monochrome image forming, a multifunction peripheral, a copying machine or a facsimile.

What is claimed is:

1. An image forming apparatus comprising:
an apparatus main body;
a sheet feeding cartridge arranged attachably/detachably with respect to the apparatus main body and storing sheets;
an optical scanning device arranged inside the apparatus main body and including a deflector deflecting a laser light scanning an image carrier outputted from a light source, a first reflection mirror part adjusting scanning curve of the laser light deflected by the deflector, and a second reflection mirror part arranged at a downstream side from the first reflection mirror part in an optical path of the laser light to adjust scanning inclination of the laser light; and
an adjustment operation transmitting part having one end part exposed in a state where the sheet feeding cartridge is detached from the apparatus main body and another end part connected to the second reflection mirror part of the optical scanning device and transmitting adjustment operation of the second reflection mirror part from one end part to another end part,
wherein the apparatus main body includes an attached part for attaching the sheet feeding cartridge,
the adjustment operation transmitting part is a drive train transmitting the adjustment operation of the second reflection mirror part from one end part to another end part, and the drive train is arranged at a side face of the attached part,
one end part of the adjustment operation transmitting part is a head part of a worm gear of the drive train,
the image forming apparatus comprises a plurality of first reflection mirror parts, a plurality of second reflection mirror parts and a plurality of adjustment operation transmitting parts corresponding to respective toners of a plurality of colors,
the plurality of adjustment operation transmitting parts include a plurality of head parts corresponding to respective toners of the plurality of colors,
the plurality of head parts are arranged side by side in upward and downward directions.

2. The image forming apparatus according to claim 1, wherein
the head part is configured so as to provide a cross recess, a slitting or a hexagon socket for applying a tool and to be capable of rotation operation from a direction drawing out the sheet feeding cartridge from the attached part,
the drive train of the adjustment operation transmitting part is configured so as to transmit the adjustment operation according to rotation operation of the head part to another end part.

3. The image forming apparatus according to claim 1, wherein
the adjustment operation transmitting part is configured so as to transmit rotation force from one end part to another end part and to adjust and operate the second reflection mirror part by utilizing the rotation force, one end part of the adjustment operation transmitting part is an adjustment operation part receiving rotation operation and producing the rotation force to include a rotation regulating mechanism regulating the rotation operation for each predetermined interval.

4. The image forming apparatus according to claim 3, wherein the rotation regulating mechanism is configured so as to include a rotation regulating gear having a plurality of grooves along an outer circumference of the adjustment operation part and a rotation regulation engaging part biased to the rotation regulating gear.

\* \* \* \* \*